No. 759,092. PATENTED MAY 3, 1904.
F. A. GARDNER.
POWER MECHANISM.
APPLICATION FILED SEPT. 22, 1903.
NO MODEL.
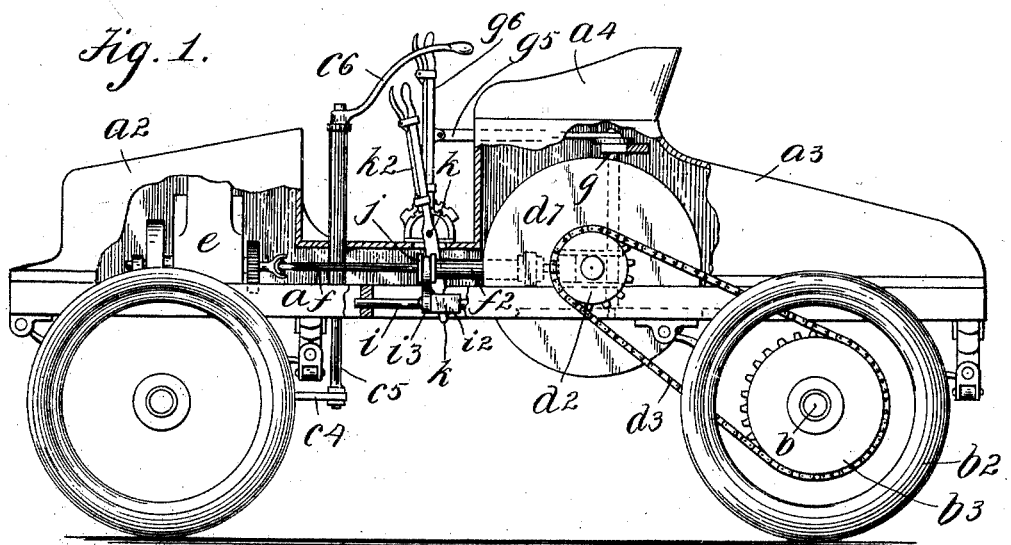
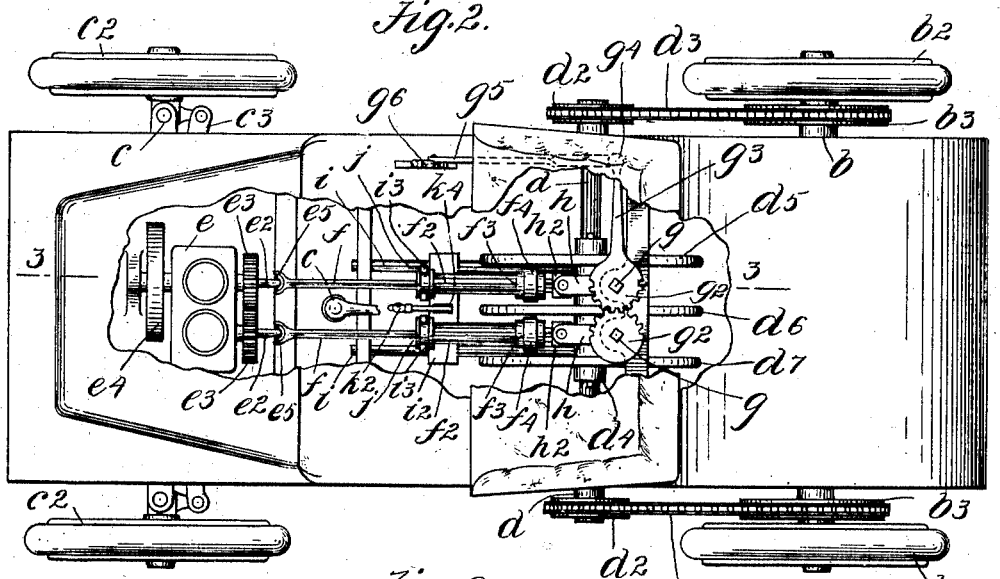
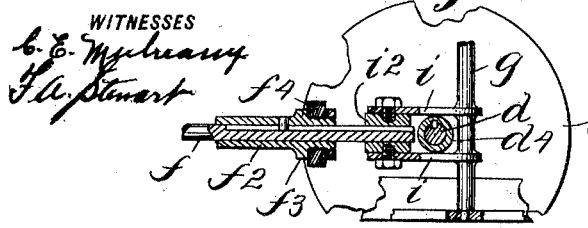
WITNESSES
INVENTOR
Frederick A. Gardner
BY
Edgar Tate & Co.
ATTORNEYS No. 759,092. Patented May 3, 1904.

UNITED STATES PATENT OFFICE.

FREDERICK A. GARDNER, OF CATSKILL, NEW YORK.

POWER MECHANISM.

SPECIFICATION forming part of Letters Patent No. 759,092, dated May 3, 1904.

Application filed September 22, 1903. Serial No. 174,173. (No model.)

*To all whom it may concern:*

Be it known that I, FREDERICK A. GARDNER, a citizen of the United States, residing at Catskill, in the county of Greene and State of New York, have invented certain new and useful Improvements in Power Mechanisms, of which the following is a specification such as will enable those skilled in the art to which it appertains to make and use the same.

The object of this invention is to provide an improved power mechanism designed particularly for use in propelling automobiles and similar self-propelled road-vehicles, a further object being to provide improved means for propelling vehicles of the class specified which is simple in construction and operation and by means of which the direction of the vehicle may be quickly and easily reversed whenever desired, said mechanism being simple in construction and operation and comparatively inexpensive.

The invention is fully disclosed in the following specification, of which the accompanying drawings form a part, in which the separate parts of my improvement are designated by suitable reference characters in each of the views, and in which—

Figure 1 is a side view of an ordinary automobile provided with my improved power mechanism, part of the construction being in section; Fig. 2, a plan view with part of the construction broken away, and Fig. 3 a partial section on the line 3 3 of Fig. 2.

In the drawings forming part of this specification I have shown at $a$ the truck-frame of an ordinary automobile, which is provided with the usual raised front body portion $a^2$ and the rear raised body portion $a^3$, on the front portion of which a seat $a^4$ is placed, and the truck or truck-frame is provided with the usual rear axle $b$, provided with the usual road-wheels $b^2$ and gear-wheels $b^3$. The front portion of the truck or truck-frame is also provided with the usual front axle $c$, with which the wheel-spindles and front road-wheels $c^2$ are connected in the usual manner, and at $c^3$, $c^4$, $c^5$, and $c^6$ I have shown a part of the usual steering or guiding mechanism; but these parts form no portion of this invention and are therefore not shown and described in detail.

In the practice of my invention I mount in the truck or truck-frame forwardly of the rear axle $b$ a main power-shaft $d$, provided at its opposite ends with gear or sprocket wheels $d^2$, which are geared in connection with the wheels $b^3$ by drive-chains $d^3$, and the shaft $d$ is preferably provided with a sleeve $d^4$, to which are rigidly secured three friction gear wheels or disks $d^5$, $d^6$, and $d^7$.

In the front portion of the truck or truck-frame is mounted an engine $e$, preferably a gas-engine of suitable construction, but any suitable motor may be provided, and this engine or motor is provided with two shafts $e^2$, geared together by means of gear-wheels $e^3$, and one of the shafts $e^2$ is also preferably provided with a fly-wheel $e^4$. Connected with the shafts $e^2$ by means of universal joints $e^5$ are two supplemental shafts $f$, which are arranged in the same horizontal plane and which range forwardly and backwardly between the main power-shaft $d$ and the engine or motor $e$. On each of the shafts $f$ is placed a sliding sleeve $f^2$, which sleeves are free to slide on the shafts, but cannot turn thereon, and each of these sleeves is provided at its rear end with an enlarged head portion $f^3$, on which is placed a friction-collar $f^4$, and the heads $f^3$ and collars $f^4$ form friction gears or heads which operate in connection with the disks or wheels $d^5$, $d^6$, and $d^7$, between which they are located, as clearly shown in Fig. 2.

Placed vertically between the friction disks or wheels $d^5$, $d^6$, and $d^7$ are shafts $g$, provided at their upper ends, respectively, with gears $g^2$, and one of these gears is provided with a crank or lever $g^3$, which is in operative connection at $g^4$ with a link-bar $g^5$, which is connected with a hand-lever $g^6$, pivoted to the bed, body, or truck-frame of the vehicle preferably at the right-hand side thereof and centrally thereof and in front of the seat $a^4$ in the usual manner.

The shafts $g$ are provided with two forwardly-directed arms $h$, which straddle the shaft $d$ and are pivoted in any desired manner to a block $h^2$, and the shafts $f$ pass into these blocks and are free to slide and turn therein.

Beneath the shafts $f$ and supported in any desired manner are two horizontal shafts $i$, on which is placed a block $i^2$, provided with two yoke-arms $i^3$, and the sleeves $f^2$ on the shafts $f$ are provided with grooved collars $j$, in connection with which the yoke-arms $i^3$ operate.

Pivoted in or over the bottom central portion of the truck-frame and between the seat $a^4$ and the front member $a^2$ of the truck-frame, as shown at $k$, is a hand-lever $k^2$, the lower end of which passes downwardly and is provided with a reduced member $k^3$, which passes through a slot or opening $k^4$ in the block $i^2$, and by means of the lever $k^2$ the block $i^2$ may be moved back and forth on the rods $i$, and this operation will also result in moving the sleeves $f^2$ back and forth on the shafts or rods $f$.

The operation will be readily understood from the foregoing description when taken in connection with the accompanying drawings and the following statement thereof: It will be understood, of course, that the shafts $f$ are always turned in opposite direction, being geared together by the wheel $e^3$, and if a person be sitting on the seat $a^4$ and throws the lever $g^6$ forwardly the arms $h$ of each of the shafts $g$ will be thrown inwardly, and the friction heads or gears at the rear ends of the sleeves $f^2$ will be pressed against the opposite sides of the central disk or wheel $d^6$, and the vehicle will be propelled forwardly. If the lever $g^6$ be pulled backwardly, the friction-heads at the rear ends of the sleeves $f^2$ will be thrown outwardly and pressed against the inner sides of the disks or wheels $d^5$ and $d^7$, and the vehicle will be propelled backwardly.

By moving the block $i^2$ forwardly, which is done by pulling the lever $k^2$ backwardly, the sleeves $f^2$ will be moved backwardly, and the friction heads or gears at the rear ends of said sleeves will be forced to operate on the disks or wheels $d^5$, $d^6$, and $d^7$, near the centers thereof, and the vehicle will be given a comparatively high rate of speed; but by reversing this operation or by forcing the lever $k^2$ forwardly this operation will be reversed. The sleeves $f^2$ will be moved forwardly on the shafts or rods $f$, and the friction heads or gears at the rear ends of said sleeves will operate on the disks or wheels $d^5$, $d^6$, and $d^7$, near the perimeters thereof, and the vehicle will be given a low rate of speed.

It will be observed that no cogs or gear-teeth are employed on or in connection with the disks or wheels $d^5$, $d^6$, and $d^7$, the gearing being simply friction-gearing, and by means of this construction a smooth and regular speed may be given to the power-shaft and to the vehicle without the jolt or jar which is occasioned by ordinary gear-wheels, and the direction of the power-shaft or the vehicle may be changed at will by the manipulation of the levers $g^6$ and $k^2$.

Any suitable motor may be employed for operating the shafts $e^2$ and various changes in and modifications of the details of the construction herein described may be made without departing from the spirit of my invention or sacrificing its advantages, and I reserve the right to make all such alterations therein and modifications thereof as fairly come within the scope of the invention.

Although I have shown and described my invention as applicable for the propulsion of vehicles, it will be apparent that the same may be applied for other purposes wherein it is desired to turn a power-shaft in either direction or reverse the movement thereof.

Having fully described my invention, what I claim as new, and desire to secure by Letters Patent, is—

1. A power mechanism comprising a main shaft provided with a plurality of friction-disks, a motor, a plurality of supplemental shafts arranged between the motor and the main shaft and at right angles to the latter and adapted to be operated by said motor and to be turned thereby in opposite directions, movable members mounted on the supplemental shafts and movable longitudinally thereof between said disks and provided with friction-heads and means for moving the ends of said shafts between said disks laterally, comprising vertically-arranged shafts mounted between said disks and geared together and provided with arms and in operative connection with the adjacent ends of the supplemental shafts, substantially as shown and described.

2. A power mechanism comprising a main shaft provided with three friction-disks, a motor, two supplemental shafts mounted between the motor end and main shaft and at right angles to the latter and adapted to be operated by said motor and to be turned in opposite directions thereby, sleeves mounted on the supplemental shafts between said disks and provided at the ends thereof adjacent to the main shaft with friction-heads, means for moving said sleeves longitudinally of the supplemental shaft, and devices for moving the ends of the supplemental shafts between said disks laterally, consisting of vertically-arranged shafts geared together and provided with arms in operative connection with the adjacent ends of the supplemental shafts, substantially as shown and described.

3. A power mechanism comprising a main shaft provided with three friction-disks, a motor, two supplemental shafts mounted between the motor and the main shaft and at right angles to the latter and adapted to be operated by said motor to be turned in opposite directions thereby, sleeves mounted on the supplemental shafts between said disks and provided at the ends thereof adjacent to the main shaft with friction-heads, means for moving said sleeves longitudinally of the supplemental shafts, and devices for moving the ends of the supplemental shafts between said disks laterally, consisting of vertically-arranged shafts geared together and provided with arms in operative connection with the adjacent ends of the supplemental shafts, said supplemental shafts being also provided with universal joints, substantially as shown and described.

4. A power mechanism for vehicles, comprising a main shaft provided with three friction-disks, a motor, two supplemental shafts arranged between the motor and the main shaft and at right angles to the latter and adapted to be operated by said motor and to be turned in opposite directions, said supplemental shafts being composed of separate parts connected by a universal joint, movable members mounted on the supplemental shafts and movable longitudinally thereof and between the said disks, and provided at the ends thereof between said disks with friction-heads, and means for moving the ends of said shafts between said disks laterally substantially as shown and described.

In testimony that I claim the foregoing as my invention I have signed my name, in presence of the subscribing witnesses, this 21st day of September, 1903.

FREDERICK A. GARDNER.

Witnesses:
F. A. STEWART,
C. E. MULREANY.